United States Patent [19]
Robertson et al.

[11] Patent Number: 6,039,410
[45] Date of Patent: Mar. 21, 2000

[54] ELECTRONIC TRAILER BRAKE CONTROLLER

[75] Inventors: Charles L. Robertson, Horton, Ala.; Michael A. Hedding, Canton; Michael C. McGrath, Farmington Hills, both of Mich.

[73] Assignee: Hayes Lemmerz International, Inc., Northville, Mich.

[21] Appl. No.: 09/004,984

[22] Filed: Jan. 9, 1998

Related U.S. Application Data

[60] Provisional application No. 60/038,294, Jan. 10, 1997.

[51] Int. Cl.[7] .......................... B60T 13/00; B60T 13/66; B60T 7/20
[52] U.S. Cl. .................. 303/7; 303/20; 188/3 R
[58] Field of Search ................ 303/3, 7, 15, 20, 303/122.04, 122.05, 124, 138; 188/1.11 R, 1.11 E, 3 R

[56] References Cited

U.S. PATENT DOCUMENTS

| | | |
|---|---|---|
| 3,497,266 | 2/1970 | Umpleby . |
| 3,503,652 | 3/1970 | Broek . |
| 3,574,414 | 4/1971 | Jacob . |
| 3,738,710 | 6/1973 | Pokrinchak et al. . |
| 3,778,118 | 12/1973 | Podlewski et al. . |
| 3,780,832 | 12/1973 | Marshall . |
| 3,909,075 | 9/1975 | Pittet, Jr. et al. ............... 303/24 C |
| 3,953,084 | 4/1976 | Pittet, Jr. et al. ............... 303/24 R |
| 3,967,863 | 7/1976 | Tomecek et al. ............... 303/24 C |
| 3,981,542 | 9/1976 | Abrams et al. . |
| 3,981,544 | 9/1976 | Tomecek et al. ............... 303/21 AF |
| 4,079,804 | 3/1978 | Paillard . |
| 4,084,859 | 4/1978 | Bull et al. . |
| 4,196,936 | 4/1980 | Snyder . |
| 4,295,687 | 10/1981 | Becker et al. ............... 303/20 |
| 4,419,654 | 12/1983 | Funk ............... 340/52 R |
| 4,721,344 | 1/1988 | Frait et al. . |
| 4,850,650 | 7/1989 | Eckert et al. . |
| 4,856,850 | 8/1989 | Aichele et al. . |
| 5,050,937 | 9/1991 | Eccleston . |
| 5,149,176 | 9/1992 | Eccleston . |
| 5,333,948 | 8/1994 | Austin et al. . |
| 5,352,028 | 10/1994 | Eccleston ............... 303/20 |
| 5,615,930 | 4/1997 | McGrath et al. ............... 303/7 |
| 5,620,236 | 4/1997 | McGrath et al. ............... 303/7 |

*Primary Examiner*—Paul N. Dickson
*Assistant Examiner*—Jeffrey Woller
*Attorney, Agent, or Firm*—MacMillan, Sobanski & Todd, LLC

[57] ABSTRACT

An electronic controller for actuating electric wheel brakes on a towed vehicle which includes a device for sensing the electric current flowing to the towed vehicle wheel brakes. The device is operative to interrupt the flow of electric current if the current flow becomes excessive. The controller also retains gain settings if the supply of power to the controller is interrupted and has a visual display for indicating results of self-diagnostic testing.

25 Claims, 9 Drawing Sheets

ELECTRONIC TRAILER BRAKE CONTROLLER

CROSS REFERENCE TO RELATED APPLICATION

This application claims the benefit of U.S. Provisional Application No. 60/038,294, which was filed on Jan. 10, 1997.

BACKGROUND OF THE INVENTION

This invention relates in general to trailer brake systems and in particular to an improved electronic brake controller for electrically actuated trailer wheel brakes.

Towed vehicles, such as recreational and utility trailers adapted to be towed by automobiles and small trucks, are commonly provided with electrically actuated wheel brakes. Such brakes generally include a pair of brake shoes associated with each trailer wheel which, when actuated, frictionally engage a brake drum which is attached to the associated wheel. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet.

Various controllers for electrically actuated brakes are known in the art. For example, a variable resistor, such as a rheostat, can be connected between the towing vehicle power supply and the electromagnets for the towed vehicle wheel brakes. The towing vehicle operator manually adjusts the variable resistor setting to vary the amount of current supplied to the wheel brake electromagnets and thereby controls the amount of braking force developed by the towed vehicle wheel brakes.

Also known in the art are more sophisticated brake controllers which include electronics to automatically supply current to the electromagnets for the towed vehicle wheel brakes when the towing vehicle brakes are applied. Such brake controllers are referred to as electronic brake controllers in the following. Electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. One such unit is disclosed in U.S. Pat. No. 4,721,344. Alternately, the hydraulic pressure in the towing vehicle's braking system or the pressure applied by the driver's foot to the towing vehicle's brake pedal can be sensed to generate the brake control signal.

Known electronic brake controllers also usually include an analog pulse width modulator which receives the brake control signal from the sensing unit. The pulse width modulator is responsive to the brake control signal to generate an output signal comprising a fixed frequency pulse train. The pulse width modulator varies the duty cycle of the pulse train in proportion to the magnitude of the brake control signal. Thus, the duty cycle of the pulse train corresponds to the amount of braking effort desired.

Electronic brake controllers further include an output stage which is electrically connected to the output of the pulse width modulator. The output stage typically has one or more power Field Effect Transistors (FET's) which are connected between the towing vehicle power supply and electromagnets for the towed vehicle wheel brakes. The power transistors function as an electronic switch for supplying electric current to the towed vehicle wheel brakes. The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle wheel brakes and the resulting level of brake application are directly proportional to the duty cycle of the modulator generated output signal.

SUMMARY

This invention relates to an improved electronic brake controller for electrically actuated trailer wheel brakes.

The present invention contemplates a trailer brake controller having a brake control signal generator for generating a brake control signal and a control device connected to the brake control signal generator. The control device is responsive to the brake control signal to generate an output brake actuation signal which is related to the brake control signal. The controller further includes an output current limiter connected to the control device and adapted to monitor the magnitude of the current being supplied by the controller to the controlled trailer wheel brake. The limiter includes a hall effect device for sensing the strength of the magnetic field generated by the current and is operative to cause the control device to interrupt the current when the magnetic field strength exceeds a predetermined value.

The current limiter also includes a metal hoop having a circular portion which encircles a wire conducting electric current to the controlled trailer wheel brake. The hoop has first and second ends extending from the circular portion and the hall effect device is slidably disposed between the first and second ends of the hoop. The hoop is carried by a housing which has a channel formed therein. The housing channel receives the first and second ends of the hoop and the hall effect device. The housing is movable relative to the hall effect device such that the first and second ends of the hoop can be moved relative to the hall effect device to calibrate the output current limiter.

In the preferred embodiment, the hoop is formed from a flat strip of metal with the first end of the hoop being flat and the second end of the hoop being L-shaped. Additionally, the L-shaped end of the loop is tapered to concentrate the magnetic field generated by the electric current flowing through the encircled wire. Alternately, the hoop can be formed from a piece of wire.

In the preferred embodiment, the control device includes a microprocessor. Alternately, the control device can include an analog brake controller circuit or a brake actuator.

The invention further contemplates that the controller includes an adjustable gain control and null adjustment for the brake control signal generator which retain their settings during a power interruption to the controller. The controller further includes a visual display and associated diagnostic routines for presenting component malfunction warnings to vehicle operator. The controller has an internal analog to digital converter which allows processing of analog brake control signals. Furthermore, the controller has a plurality of manual brake control signal input ports. It also is contemplated that the controller continuously generates a minimum brake output signal to compensate for the tension in the brake return springs.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
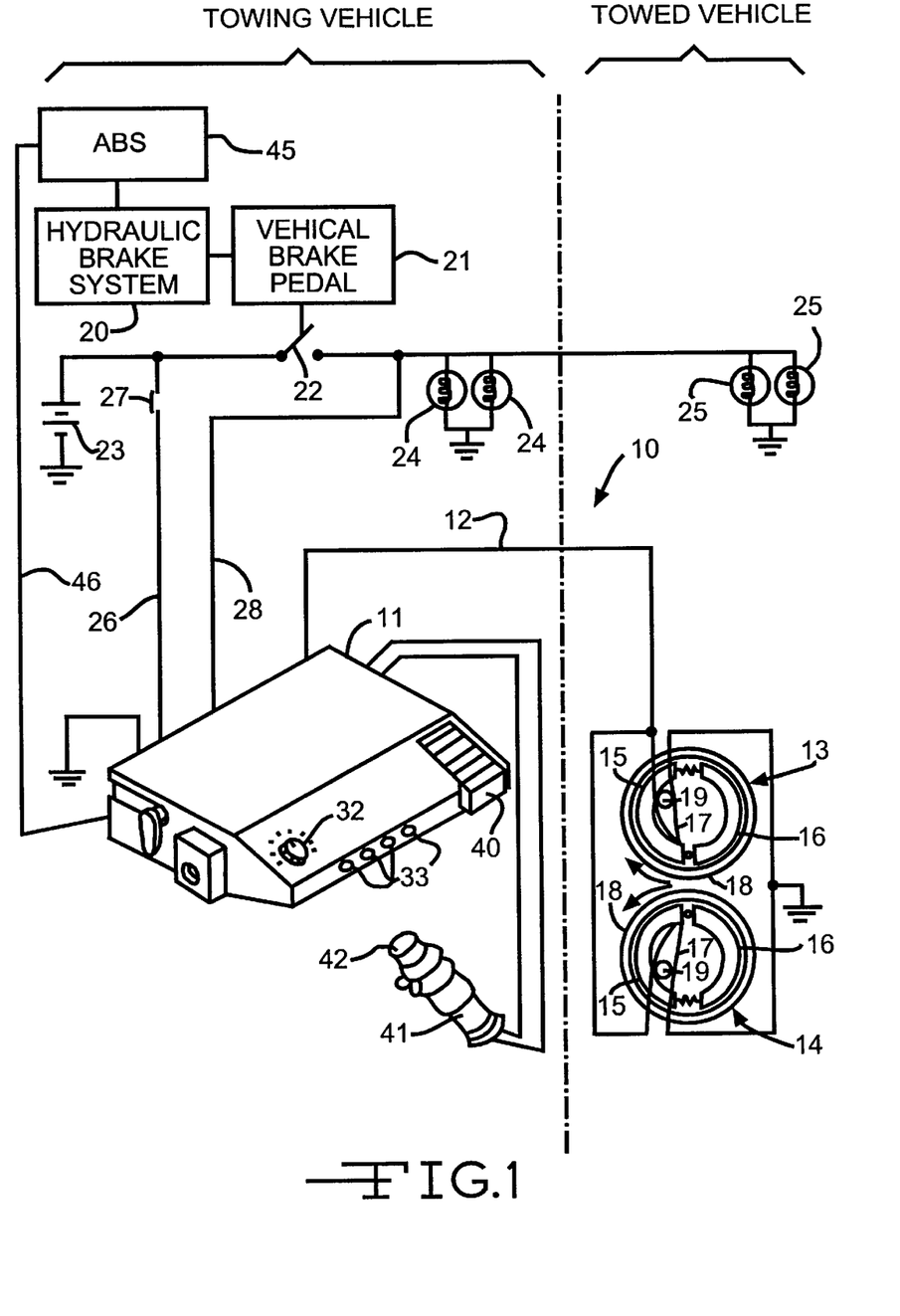
FIG. 1 is a schematic diagram of an electrically actuated wheel brake system which includes an electronic brake controller in accordance with the invention.
Figure 2A:
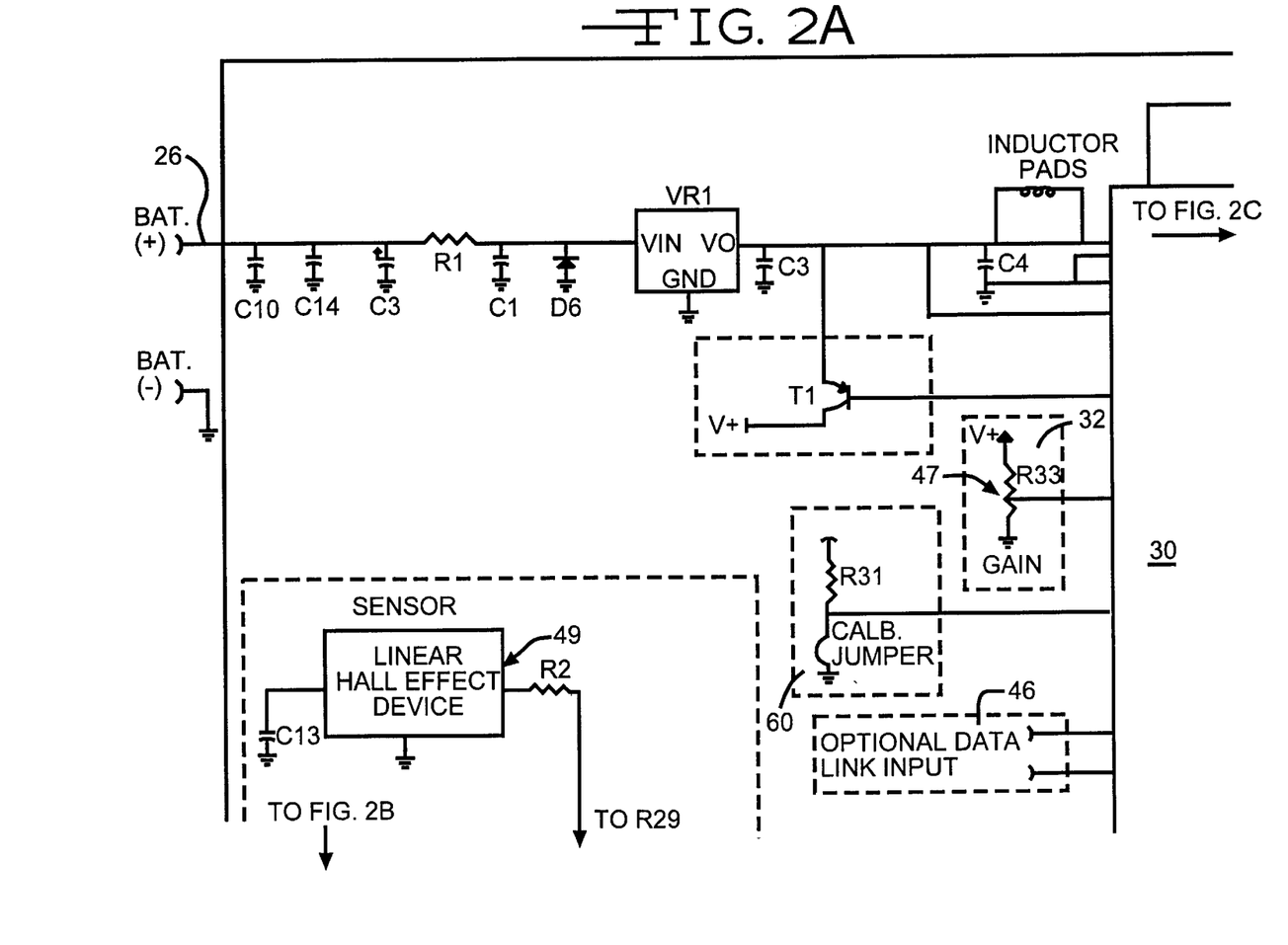
FIG. 2 is a schematic diagram of the electronic brake controller shown in FIG. 1.
Figure 2B:
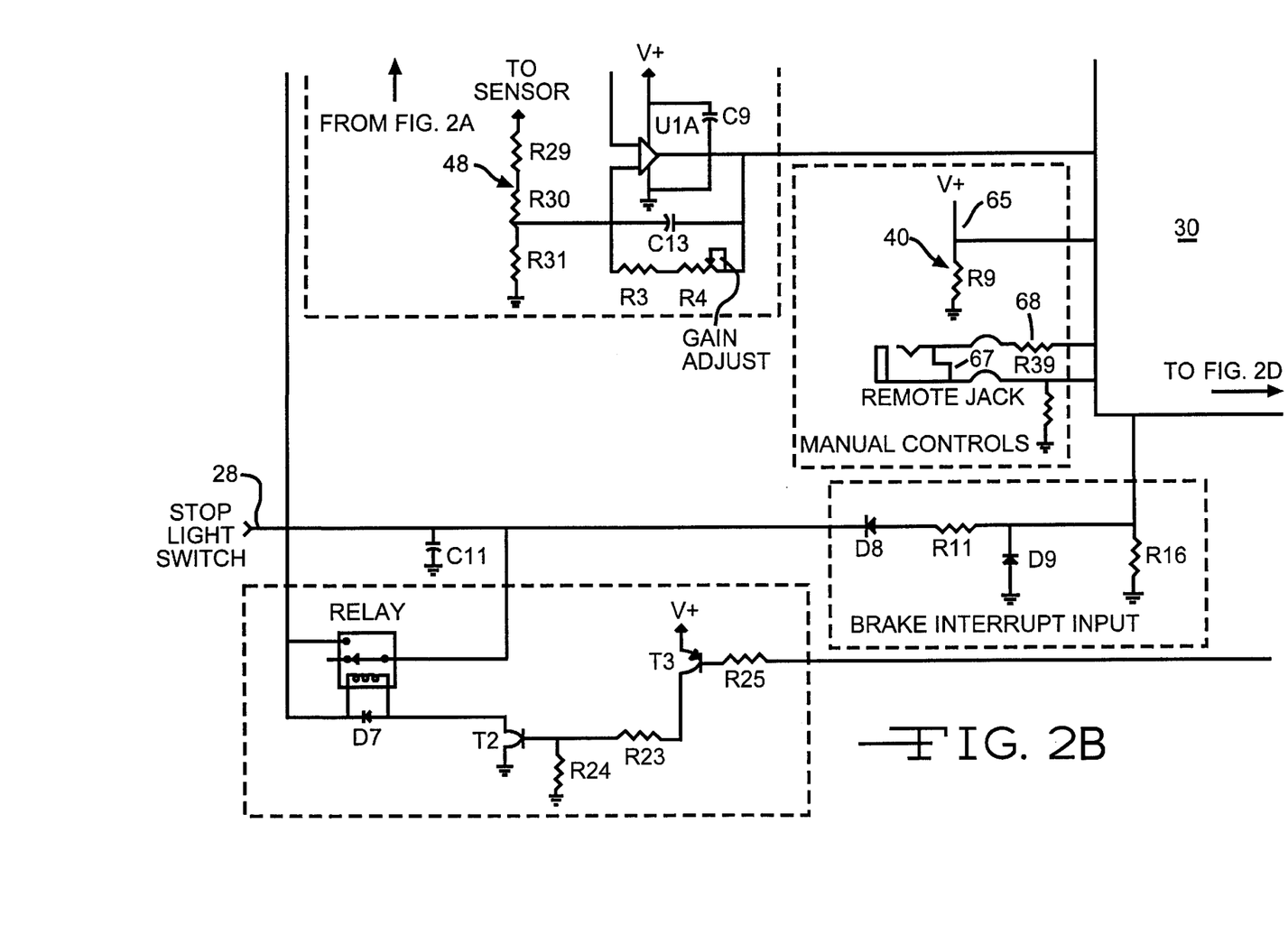
Figure 2C:
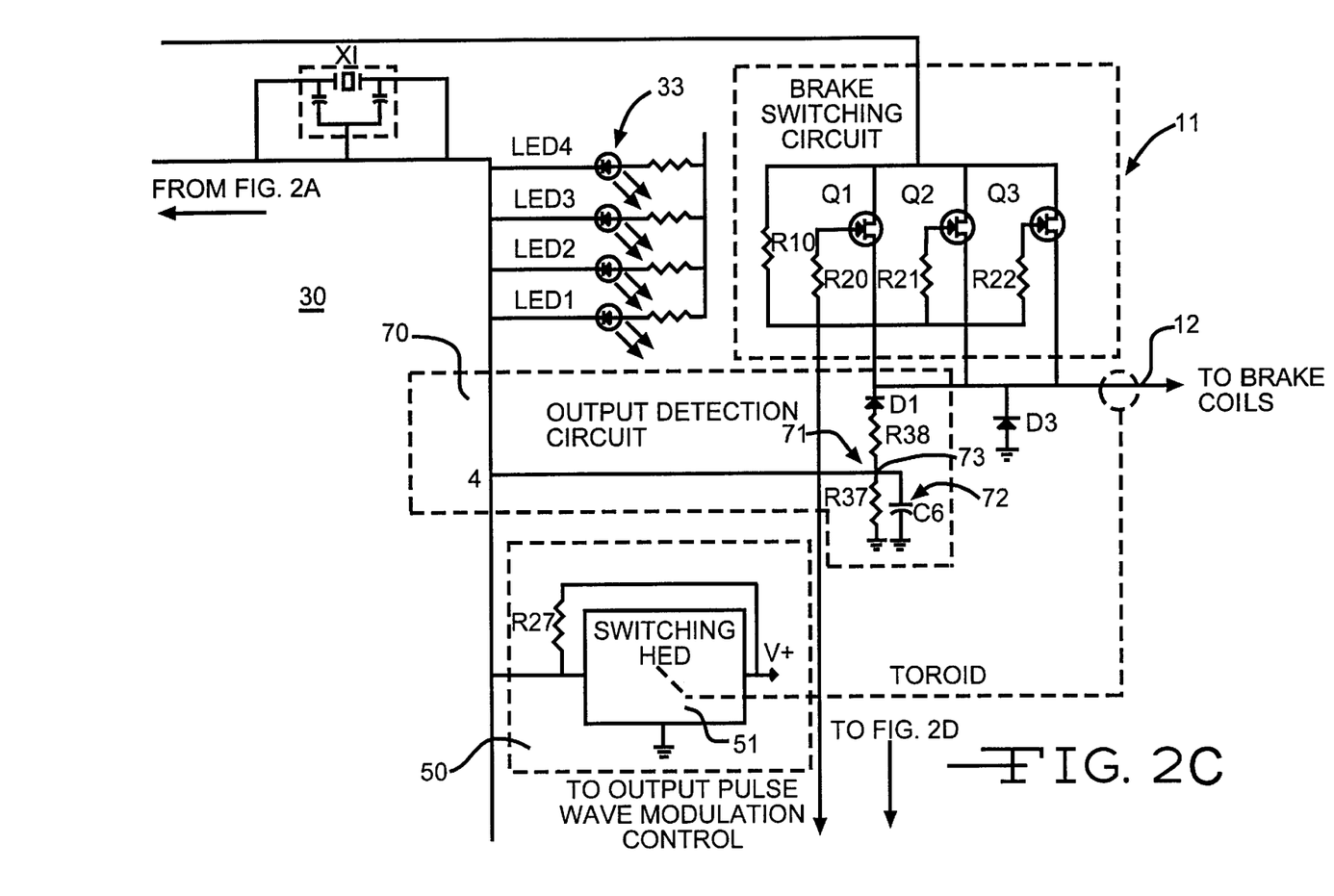
Figure 2D:
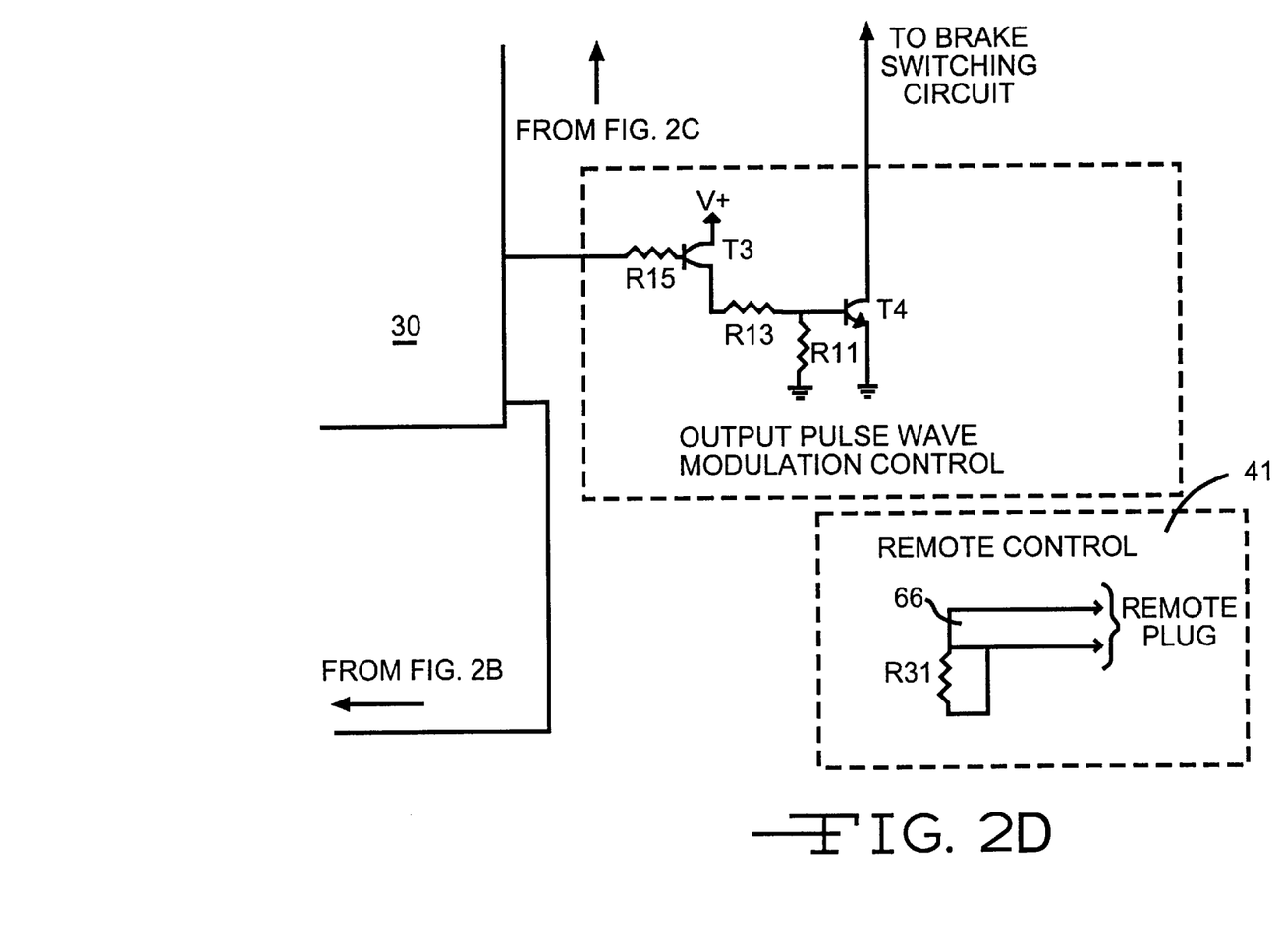

Referring now to the drawings, there is shown in FIG. 1 a schematic diagram illustrating an electric brake system for a towed vehicle (not shown), shown generally at 10, which utilizes an improved electronic brake controller 11 embodying the principles of the present invention. The brake controller 11 is typically located in a towing vehicle (not shown), usually being mounted beneath the towing vehicle dashboard. When actuated, the controller 11 functions to supply an electric current through line 12 to energize electric wheel brakes 13 and 14 which brake the wheels of the towed vehicle (not shown).

The electric wheel brakes 13 and 14 each include a pair of brake shoes 15 and 16 which, when actuated by a lever 17, are expanded into contact with a rake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of wheel brakes 13 and 14, the invention also can be applied to towed vehicles having more than two sets of wheel brakes.

The towing vehicle typically includes a conventional hydraulic brake system 20 which is actuated when a brake pedal 21 is depressed by a vehicle operator. The brake pedal 21 is coupled to a brake light switch 22. When the brake pedal 21 is depressed, the brake light switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a first line 26 through a circuit breaker 27 to the controller 11. Power is continuously supplied to the controller 11 through the first line 27. A second line 28 connects the brake light side of the brake light switch 22 to the controller 11. The second line 28 supplies power to the controller 11 when the brake light switch 22 is closed upon actuation of the towed vehicle brakes.

The brake controller 11, portions of which are described in detail in U.S. Pat. Nos. 5,620,236 and 5,615,930, which are incorporated herein by reference, senses the braking force applied to the towing vehicle and generates a brake control signal. In the preferred embodiment, a pendulum device senses the braking force. The pendulum carries a permanent magnet which cooperates with a Hall Effect Device (HED) to generate the brake control signal, however, it will be appreciated that other conventional devices can be used to generate the brake control signal.

As shown in FIG. 2, the controller 11 further includes a microprocessor 30. The microprocessor 30 is responsive to the brake control signal to generate an output signal. The output signal is a pulse train which is transmitted through line 12 to actuate the electric brakes 13 and 14. The output signal is related to the brake control signal by an adjustable controller gain. In the preferred embodiment, the output signal has a constant frequency and a variable duty cycle which is proportional to the brake control signal.

A rotatable gain selector 32 is mounted on the front of the controller 11 and, as will be described below, is operative to select the controller gain setting. The controller 11 also includes a plurality of Light Emitting Diodes (LED's) 33 which provide visual feedback to the towing vehicle operator concerning the selected gain setting and other selected controller parameters.

A manual switch 40 is provided on the electronic controller 11 to allow the vehicle driver to actuate the towed vehicle wheel brakes 13 and 14 without applying the towing vehicle brakes. Pressing the manual switch 40 causes the microprocessor 30 to generate the output signal which actuates the wheel brakes 13 and 14. The controller 11 also is provided with a hand held manual remote switch 41. The manual remote switch 41 includes a push-button 42 which can be used to actuate the controller 11. When either the manual switch 40 or the manual remote switch push-button 42 are pressed, the towing vehicle and towed vehicle brake lights 24 and 25 are illuminated.

In the preferred embodiment, the controller 11 is electrically coupled to an anti-lock brake system 45 (ABS), which is included in the towing vehicle, by a data link 46. However, the data link 46 is optional and the present invention can be practiced on a controller which does not include a data link 46. While a single line is shown for the data link 46 in FIG. 1, it will be appreciated that the data link 46 may be a multi-conductor cable or a portion of a data highway.

The ABS 45 is of a conventional design and is responsive to data concerning the operation of the towing vehicle to control the hydraulic brake system 20 during impending wheel brake lock-up conditions. The ABS 45 sends data over the data link 46 to the controller 11. The controller 11 is responsive to the data to control the towed vehicle brakes 13 and 14 as a function thereof. For example, actuation of the ABS 45 due to an impending wheel lock-up condition of the towing vehicle brakes could cause the brake controller 11 to decrease the braking intensity of the towed vehicle brakes. Other examples of data which can be transmitted from the ABS 45 to the controller 11 include vehicle speed, vehicle deceleration, brake failure, brake application, and changes in road surface conditions.

The communication over the data link 46 is bi-directional, with the controller 11 also sending data to the ABS 45. For example, the controller 11 could transmit the controller gain, which is indicative of the towed vehicle load, to the ABS 45. The ABS 45 would accordingly adjust the magnitude of the towing vehicle braking. However, it will be appreciated that the communication over the data link 45 also can be unidirectional.

While the controller 11 has been illustrated as being connected to an ABS 45 in FIG. 1, it will be appreciated that the controller 11 also can be connected to and communicating with other vehicle control systems. Examples of such systems include traction control systems, vehicle stability management systems, engine control computers and vehicle diagnostic computers.

A schematic diagram of the improved electronic brake controller 11 is shown in FIG. 2. Portions of the schematic diagram which are similar to portions described in the above referenced patents are identified with the same nomenclature. The improved electronic controller includes the following features, which are not included in the above referenced co-pending patent applications:

The present invention contemplates that an adjustable analog controller gain signal is applied to a gain input pin 5 on the microprocessor 30. In the preferred embodiment, the microprocessor gain input pin 5 is connected to the slider of a 10K gain potentiometer 47 which is coupled to the rotatable selector 32. The gain potentiometer 47 is connected between a regulated five volt power supply and ground. Thus, the voltage on pin 5 will be proportional to the potentiometer slider position. Periodically, a comparator circuit (not shown) within the microprocessor 30 compares the pin voltage to ten discrete voltage levels and selects the discrete voltage which is closest to the pin voltage. Each of the ten discrete voltages corresponds to one of ten discrete controller gain settings stored in a memory portion of the microprocessor 30. The microprocessor 30 selects the stored gain setting corresponding to the discrete voltage for the controller gain.

The vehicle operator can select a different gain setting by rotating the gain selector 32, which moves the potentiometer slider to change the voltage applied to pin 5. The microprocessor 30 detects the changed voltage during one of the periodic checks of the voltage on pin 5 and adjusts the controller gain accordingly. As in the controllers described in the above referred patents, the microprocessor 30 is programmed to illuminate combinations of the LED's 33 to visually display the controller gain setting to the towing vehicle operator.

The gain potentiometer 47 precludes loss of the controller gain setting during power up or power down of the controller 11 since the value of the gain is determined by the physical setting of the gain potentiometer 47. Thus, if the vehicle battery 23 is disconnected from the controller 11 during vehicle servicing, or if the power supply line 26 is interrupted for any reason, it is not necessary to reset the controller gain.

The improved controller 11 differs from the controllers described in the above referenced patents, wherein the vehicle operator manually sets the controller gain by sequentially depressing a push-button mounted upon the controller housing. The previous versions of the controller also had a stored default gain setting which was supplied to the controller upon start up. Accordingly, upon reestablishing an interrupted supply of power, the previous version of the controller would have automatically set the controller gain to the stored default value, which may not have been the same as the gain setting before the power interruption. When the default gain setting differed from the desired gain setting, the vehicle operator would be required to manually reset the gain.

The microprocessor 30 also includes an internal analog/digital converter (not shown). Thus, analog brake control signals which are generated by a sensor, which is labeled 49 in FIG. 2, the manual switch 30 or the remote manual switch 31 are applied directly to corresponding pins, designated as 2, 3 and 18, respectively, on the microprocessor 30.

The present invention further contemplates including a brake current limit interrupt device in the improved controller 11. As shown in FIG. 1, the supply power line 26 which supplies electrical power to the controller 11 from the vehicle power supply is the same line which supplies current to the towed vehicle brake electromagnets 19 through the power FET's in the brake switching circuit. As also shown in FIG. 1, a circuit breaker 27 is included in the power supply line 26 to protect the controller components from excessive current. Alternately, a fuse (not shown) can be included in the power supply line 26. However, it has been discovered that if a short circuit develops in the towed vehicle brake circuit, the power FET's in the brake switching circuit could be damaged by the resulting high current before the circuit breaker 27 or fuse opens to interrupt the current flow to the towed vehicle brakes. Accordingly, the improved controller 11 includes a brake current limit interrupt device which is shown generally at 50 in FIGS. 2 through 5.

The brake current limit interrupt device 50 senses the brake current flowing from the power FET's in the brake switching circuit to the wheel brake electromagnets 19. The current limit interrupt 50 is operative to cause the microprocessor 30 to shut off the power FET's when a threshold brake current level is exceeded.

The brake current limit interrupt device 50 comprises a switching Hall Effect Device (HED) 51 slidably mounted within a channel formed in a housing 52. The switching HED 51 includes a small sensor element (not shown), which in the preferred embodiment is formed from a semiconductor material, embedded in the center thereof. In the preferred embodiment, the sensor element is a 0.010 inch square. The sensor element generates an electric potential when subjected to a magnet field. The switching HED 51 farther includes an output transistor (not shown) which is electrically connected to the sensor element. When there is no magnetic field present, the output transistor is in a non-conducting state. As the magnetic field increases, the voltage across the HED sensor element increases. When the voltage across the sensor element exceeds a predetermined threshold value, the output transistor changes to a conducting state. Thus, the switching HED 51 functions as switch.

Figure 4:
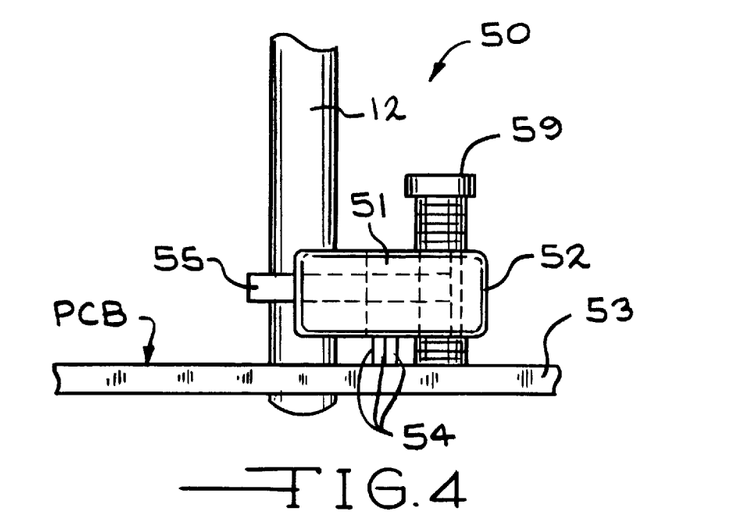
FIG. 4 is an elevation view of the current monitoring device shown in FIG. 3.
Figure 5:
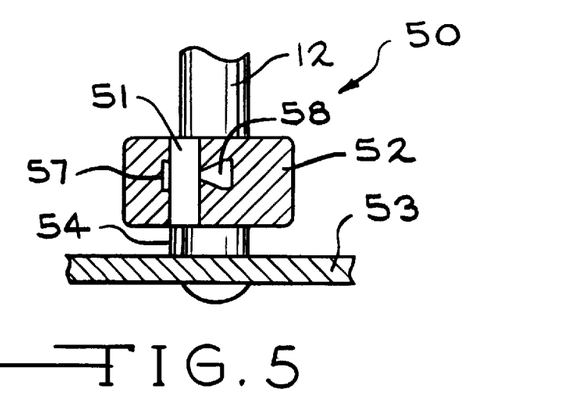
FIG. 5 is a sectional view of the current monitoring device take along line 5—5 in FIG. 3.

For reasons explained below, the housing 52 can be moved relative to the switching HED 51 in a vertical direction in FIGS. 4 and 5. The switching HED 51 is connected to a printed circuit board (PCB) 53 by three lead wires 54, which fix the switching HED 51 in a vertical position relative to the PCB 53. The PCB 53 also carries the microprocessor 30 and the power FET's (not shown) which control the flow of electric current to the electromagnets 19 of the towed vehicle wheel brakes 19 and other controller electronic components.

Figure 3:
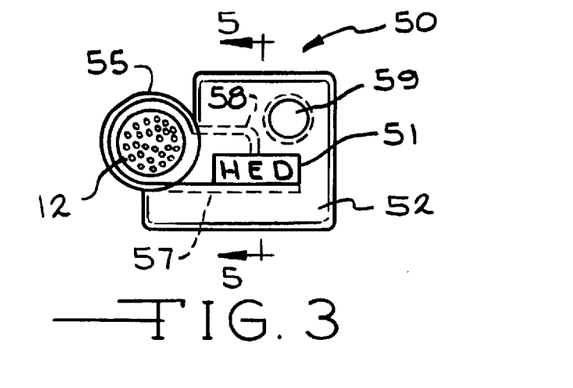
FIG. 3 is a plan view of a current monitoring device which is included in the electronic brake controller shown in FIG. 1.

As best seen in FIG. 3, a toroidal flux concentrator hoop 55 formed from a flat strip of metal extends from the switching HED 51. The hoop 55 includes a circular portion which encircles the wire 12 leading from the printed circuit board 53 to the towed vehicle wheel brake electromagnets 19. The wire 12 carries the brake current controlled by the power FET's. The flux concentrator hoop 55 includes a first flat end 57 and a second L-shaped end 58 which extend from the circular portion thereof. As shown in FIG. 5, the tip of the L-shaped end 58 is tapered to form a focal point for magnetic flux. The hoop 55 is molded into the housing 52 and the switching HED 51 is disposed between the first and second ends 57 and 58 of the hoop 55 with the first end 57 adjacent to one side of the switching HED 51 and the focal point of the second end 58 contacting the opposite side of the switching HED 51. While the preferred embodiment of the hoop 55 has been illustrated and described as being formed from a flat strip, it will be appreciated that the invention also can be practiced utilizing other structures for the hoop 55. For example, the hoop 55 can be formed from a length of wire (not shown).

An adjustment screw 59 is disposed in a threaded opening formed through the housing 52 and extends into contact with the PCB 53. Turning the screw 59 moves the housing 52 and the flux concentrator hoop 55 in a vertical direction in FIGS. 4 and 5 relative to the sensor element embedded within the switching HED 51. As the housing 52 moves, the focal point on the second end 58 of the hoop 55 is displaced relative to the switching HED 51 to vary the threshold for actuation of the switching HED 51. Thus, the screw 59 provides for calibration of the current limit interrupt device 50. Once the current limiter 50 is calibrated, an adhesive or epoxy (not shown) is applied to the housing 52 and the adjustment screw 59 to fix the position of the focal point of the flux concentrator hoop 55 relative to the switching HED 51.

As shown in FIG. 2, the switching HED 51 is connected between a current sensing pin 27 of the microprocessor and ground. During normal operation, the output transistor within the switching HED 51 is in a non-conducting state and a regulated five volts is applied through a 10K pull up resistor to current sensing pin 27 on the microprocessor 30. The regulated five volts also is applied as a bias voltage to the output transistor.

The operation of the current limit interrupt device 50 will now be explained. The sensing element within the switching HED 51 senses the strength of the magnetic field associated with the magnetic flux generated by the current flowing through the wire 12 to the trailer wheel brake electromagnets 19. The magnetic field increases in direct proportion to the magnitude of the brake current in the wire 12. The focal point in the second end of the toroidal hoop 55 concentrates the magnetic field and directs the field toward the sensing element in the switching HED 51. When the magnetic field reaches a predetermined strength, which corresponds to a brake current in excess of the current normally required to operate the towed vehicle brakes, the associated voltage across the sensing element causes the output transistor to change to its conducting state. When the conducting output transistor is in its conducting state, the microprocessor current sensing pin 27 is connected to ground. The microprocessor 30 is responsive to the change of condition at pin 27 to cause the brake driver circuit to shut off the power FET's in the brake switching circuit. Additionally, the microprocessor 30 is programmed to flash the LED's 33 in the visual, or light, display to alert the vehicle operator that the current limit is exceeded.

The inventors have found that the time required for the current limit interrupt device 50 to respond to an excessive brake current is much less than the time required for the circuit breaker 27 or a fuse to open. Additionally, the current limit interrupt device 50 is not inserted into the current path, but is separate therefrom. Prior art monitoring circuits typically include a small sensing resistor connected in the current path. The voltage appearing across the sensing resistor is proportional to the current flowing therethrough. However, such sensing resistors result in a lower voltage being applied to the brake electromagnets 19 while generating heat within the controller housing. Because the present invention eliminates such sensing resistors, the controller 11 is cooler and there is less a voltage drop between the power supply and the brake electromagnets 19.

Figure 6A:
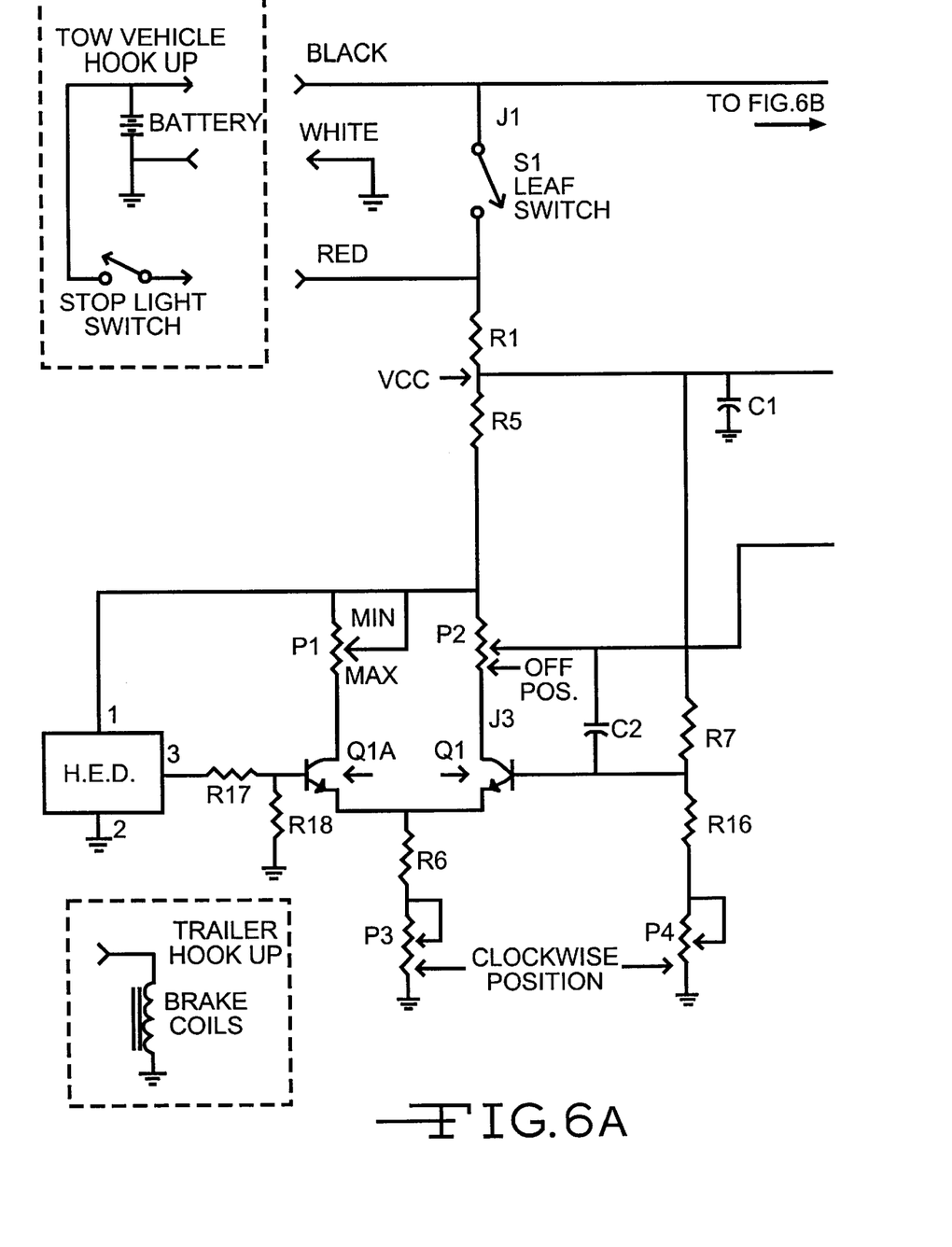
FIG. 6 is a schematic diagram of an analog brake controller which includes the current monitoring device shown in FIG. 4.
Figure 6B:
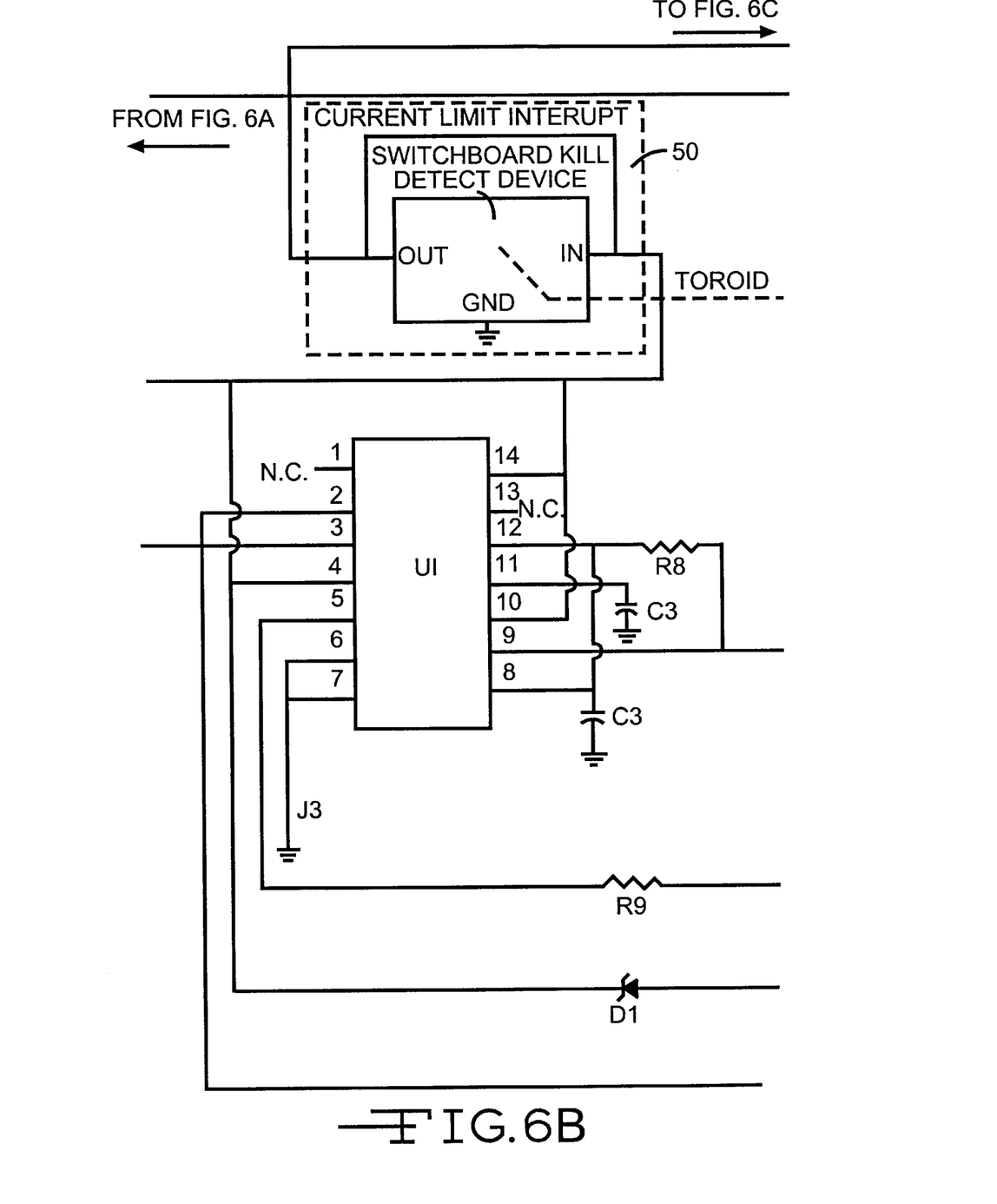
Figure 6C:
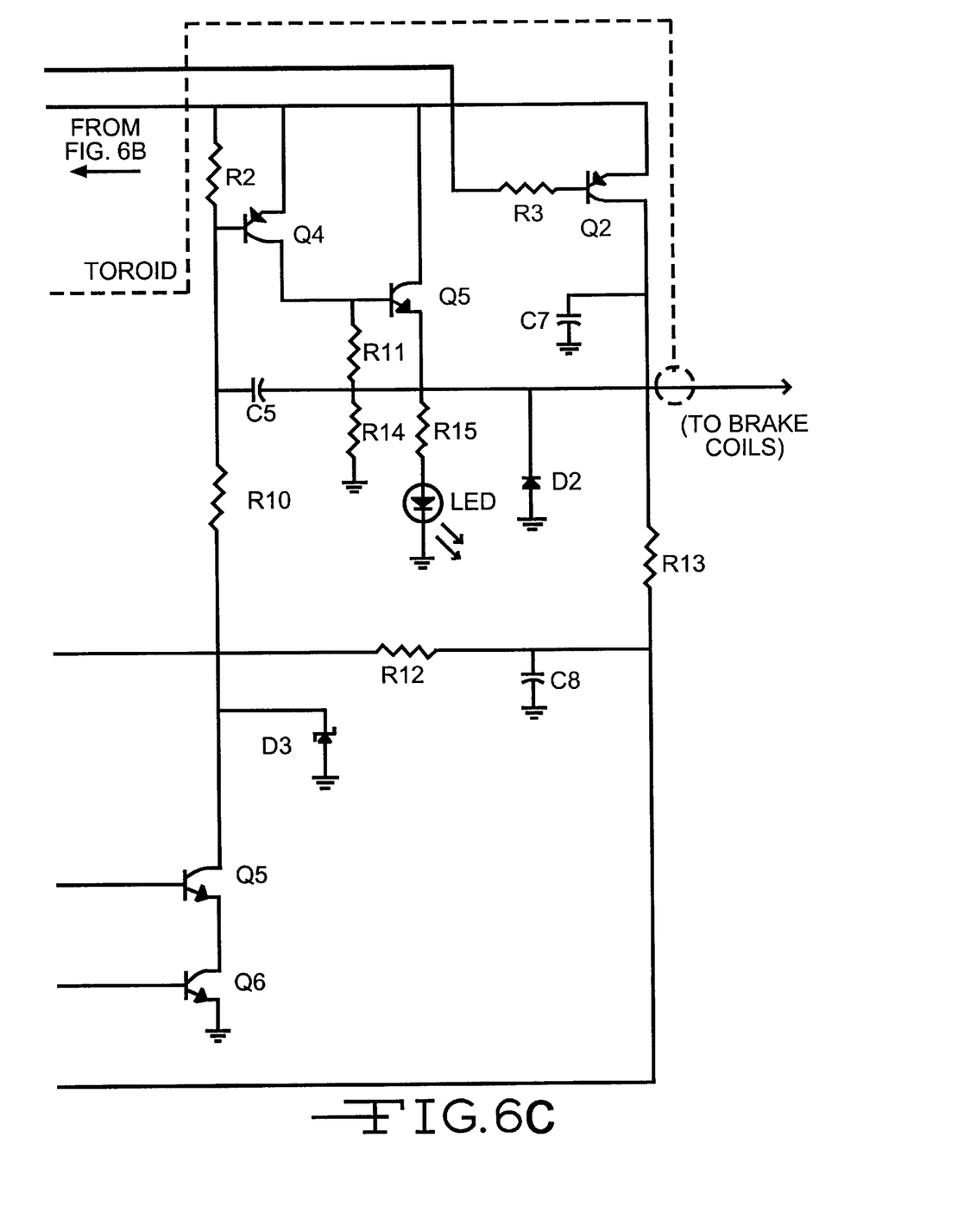

While the preferred embodiment has been shown and described with the current limit interrupt device 50 included in a controller having a microprocessor 30, the present invention also can be practiced with an analog brake controller. The current limit interrupt device 50 is included in a representative circuit diagram for analog controller circuit in FIG. 6. The controller shown in FIG. 6 is described in U.S. Pat. No. 4,721,344, which is incorporated herein by reference. In FIG. 6, the current limiting device 50 is operative to turn on transistor Q2 when the brake current reaches a predetermined value. When Q2 conducts, a voltage is applied to pins 2 and 9 of the integrated circuit U1. The applied voltage causes the integrated circuit U1 to turn off an output signal on pin 5 and thereby interrupt the brake current. When the brake current is below the predetermined value, a voltage is applied to the base of transistor Q2 to maintain the transistor in its non-conducting state. Accordingly, the integrated circuit U1 will generate an output signal as required to actuate the towed vehicle wheel brakes. It will be appreciated that the circuit shown in FIG. 6 is illustrative and that the invention contemplates including the current limiting device 50 in other conventional brake controllers and actuators.

The present invention also contemplates presetting a zero-adjustment for the sensor 49 at the factory. The sensor 49 in the brake control signal generator detects towing vehicle deceleration and generates a brake control signal. In the above referenced patents, a pendulum device is used to measure deceleration. Unfortunately, the sensor 49 also typically generates a small null voltage. Due to variations in the components comprising the sensor 49, the null voltage varies between units. Accordingly, null circuitry was included for the vehicle operator to null, or zero adjust the sensor in the brake control signal generator. However, this proved to be inconvenient for the vehicle operator. The improved controller 11 includes a circuit for factory calibration of the sensor 49 in the brake control signal generator.

In the preferred embodiment, a microprocessor calibration pin 26 is grounded with a removable jumper 60 when the controller 11 is assembled. As described above, the controller includes a null offset potentiometer 48 which is connected between the regulated five volt supply and ground. The potentiometer slider is connected to the negative input terminal of an operational amplifier included in the brake control signal generator.

The microprocessor 30 is responsive to a ground potential on pin 26 to enter a calibration subroutine stored in the memory to display calibration codes on the LED's 33 which relate to the output voltage of the operational amplifier in the sensor 49. A technician adjusts the null offset potentiometer 48 to apply a sufficient voltage to the negative operational amplifier terminal to cancel the sensor null voltage. As a result, the operational amplifier output becomes zero and the LED's 33 display an indication when the sensor null voltage has been offset.

After the calibration is completed, the jumper 60 is removed, which raises the voltage at pin 26 to five volts. The microprocessor 30 senses the increased voltage and is responsive thereto to end the calibration subroutine. While the preferred embodiment has illustrated and described with a jumper 60, it will be appreciated that the invention also can be practiced with other conventional devices, such as a switch (not shown), connected between the current sensing pin 26 and ground.

Previous brake controllers included a manual and remote manual control which permitted the vehicle operator to generate analog brake control signals. Both manually generated brake control signals were applied to the same microprocessor input pin in the previous controllers. In the present invention, the manual brake control signal inputs have been separated. This permits the microprocessor to recognize a failure of either the manual or the remote manual control, 40 and 41, and illuminate a corresponding LED 33 to alert the vehicle operator of the failure and the failed control. The particular LED which is illuminated would indicate whether the manual or remote manual control had failed. While prior art brake controllers provide a constant voltage, typically five volts, upon failure of one of the manual controls, the present invention contemplates that the voltage on the corresponding microprocessor pin floats at a low value. This low voltage value is detected by the microprocessor 30 which is responsive thereto to illuminate an LED 33 as described above. Alternately, the microprocessor can cause the LED to flash as an failure indication.

The manual control, which is shown as a push-button 40 in FIG. 1, includes a potentiometer 65 which has a first end connected to a regulated five volt supply and a second end connected through a 5.1K resistor to ground. In the preferred embodiment, the potentiometer 65 is 20K, however, other resistance values can be used. The potentiometer slider is connected directly to pin 3 of the microprocessor 30. Thus, movement of the push-button moves the slider to apply a brake control signal to pin 3 which is a voltage within a range from approximately one volt to five volts.

The remote manual control 41 is a hand held unit which includes another 20K potentiometer 66. The leads of remote manual control 41 are inserted into a remote jack which is connected between pins 18 and 7 of the microprocessor 30. When the remote manual control 41 is not connected to the microprocessor, an internal jumper 67 connects a fixed 20 K resistor 68 across the pins 18 and 7. Upon insertion of the remote manual control leads into the jack, the jumper is opened, connecting the potentiometer 66 in series between the fixed resistor 68 and pin 7. A voltage divider tap between the potentiometer 66 and the fixed resistor 67 connected directly to pin 18 of the microprocessor 30. Thus, movement of the push-button varies the resistance connected between pins 18 and 7. The microprocessor 30 is responsive to the resistance connected between pins 18 and 7 to generate a remote manual brake control signal. While the preferred embodiment has been described as having a 20K potentiometer 66 and 20K fixed resistor 68, it will be appreciated that other resistance values can be used.

The microprocessor 30 in the improved controller 11 is programmed to generate a Pulse Width Modulated (PWM) output signal having a minimum duty cycle of 6–10% when the brake light switch is actuated. This minimum duty cycle is sufficient to overcome the tension in the brake return springs. Accordingly, the towed vehicle wheel brakes are ready to be applied and do not abruptly engage the associated brake drums when the microprocessor 30 increases the brake driver duty cycle in response to a brake control signal.

The invention also contemplates that the data link 46 can be connected to other sensors or to microcomputers included in other systems in the towing or towed vehicle, such as engine controls, diagnostic computers, traction control systems or anti-lock brake systems. However, as described above, the data link 46 is an optional feature and the invention can be practiced without a data link 46.

The improved brake controller 11 also includes an output detection circuit 70. The output detection circuit 70 includes a voltage divider 71 connected between the output terminal of the brake switching circuit and ground. A capacitor 72 is connected between the center tap 73 of the voltage divider 71 and ground. The center tap 73 also is connected to pin 4 of the microprocessor 30.

An analog to digital converter within the microprocessor 30 converts the analog voltage appearing at pin 4 to a digital equivalent. The microprocessor software compares the digital equivalent of the voltage at pin 4 to an expected value. If there is a difference between the compared values, the microprocessor illuminates selected LED's 33 to alert the operator of the towing vehicle. Thus, the microprocessor 30 can detect if the output FET's controlling the electric current flowing to the towed vehicle brake electromagnets 19 are open or short circuited. If the output FET's are open when the brakes are applied, pin 4 will be at ground potential and no LED's will be illuminated. If the output FET's are short circuited, pin 4 will be above ground potential and all of the LED's are illuminated without the brakes being applied.

During a braking cycle, the microprocessor 30 continues to monitor the voltage at pin 4, which is proportional to the magnitude of the current being supplied to the towed vehicle brakes 13 and 14. The microprocessor 30 is responsive to the voltage at pin 4 to illuminate the LED's 33 as a visual indication of the magnitude of the brake current which corresponds to the intensity of the towed vehicle brake application. The number of LED's 33 illuminated is increased in proportion to the intensity of the towed vehicle braking. This provides visual feedback to the vehicle operator.

In the preferred embodiment, the microprocessor 30 is programmed to periodically run diagnostic subroutines and to illuminate combinations of the LED's 33 if a malfunction is detected. The specific combination of illuminated LED's would identify the malfunction. For example, when the brake controller 11 is returned to a full service condition from a partially shut-down condition, or "sleep" mode, the relay in the manual brake light control is momentarily energized to determine if the relay is properly functioning.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the values shown for circuit components in FIGS. 2 and 6 are meant to be illustrative and it will be appreciated that the invention also can be practiced utilizing other values for components than those shown in the figures.

What is claimed is:

1. A trailer brake controller comprising:
   a brake control signal generator for generating a brake control signal;
   a microprocessor connected to said brake control signal generator and responsive to said brake control signal to generate an output brake actuation signal which is related to said brake control signal by a brake controller gain;
   a memory connected to said microprocessor; said memory storing a plurality of predetermined brake controller gains; and a gain control for producing a gain control signal, said gain control connected to said microprocessor, said gain control operable by a vehicle operator to select a gain control signal, said gain control maintaining said selected gain control signal once said gain control is set by said operator, said microprocessor being responsive to said gain control signal to select one of said predetermined gains from said memory for said brake controller gain.

2. A trailer brake controller comprising:

a brake control signal generator for generating a brake control signal;

a microprocessor connected to said brake control signal generator and responsive to said brake control signal to generate an output brake actuation signal which is related to said brake control signal by a controller gain;

a memory connected to said microprocessor; said memory storing a plurality of predetermined gains; and a gain control for producing a gain control signal, said gain control connected to said microprocessor, said gain control including a potentiometer having a variable resistance and said gain control signal being a voltage appearing across a portion of said potentiometer, said potentiometer being adjustable by a vehicle operator to vary said gain control, said gain control maintaining said gain control signal once set by said operator, said microprocessor being responsive to said gain control signal to select one of said predetermined gains from said memory for said controller gain.

3. A trailer brake controller comprising:

a brake control signal generator for generating a brake control signal;

a microprocessor connected to said brake control signal generator and responsive to said brake control signal to generate an output brake actuation signal which is related to said brake control signal; and a visual display connected to said microprocessor, said microprocessor operative to visually display indicators upon said visual display related to the trailer brake controller operation.

4. A trailer brake controller according to claim 3 wherein said displayed indicators are diagnostic in nature.

5. A trailer brake controller according to claim 4 wherein said displayed indicators include warning devices which are indicative of a malfunctioning component in the brake controller.

6. A trailer brake controller comprising:

a brake control signal generator for generating a brake control signal said brake control signal generator being adapted to be mounted in a towing vehicle;

a microprocessor connected to said brake control signal generator and responsive to said brake control signal to generate an output brake actuation signal which is related to said brake control signal;

a sensor for detecting deceleration of said towing vehicle, said sensor connected to said brake control signal generator and operable to generate a null signal when said towing vehicle is at rest;

an adjustable null offset signal generator connected to said brake control signal generator for generating a null offset signal, said null offset signal generator maintaining said null offset signal at a value corresponding to a setting of said null offset signal generator to cancel said sensor null signal, said microprocessor including a brake signal generator calibration subroutine for displaying calibration data upon said visual display for adjustment of said null offset signal generator when said microprocessor is connected to a selection device for actuating said brake signal generator calibration subroutine; and a visual display connected to said microprocessor, said microprocessor operative to visually display indicators related to controller operation.

7. A trailer brake controller according to claim 6 wherein said adjustable null offset generator includes a potentiometer having a variable resistance and said null offset signal is a voltage appearing across a portion of said potentiometer, said potentiometer being adjustable to vary said null offset signal.

8. A trailer brake controller according to claim 7 wherein said selection device is a removable jumper connected between a calibration pin on said microprocessor and ground, said brake signal generator calibration subroutine being actuated when said jumper is in place.

9. A trailer brake controller according to claim 7 wherein said selection device is a switch having an open position and a closed position, said switch connected between a calibration pin on said microprocessor and ground, said brake signal generator calibration subroutine being actuated when said switch is in said closed position.

10. A trailer brake controller for supplying electrical current to a trailer wheel brake, the controller comprising:

a brake control signal generator for generating a brake control signal;

a control device connected to said brake control signal generator and responsive to said brake control signal to generate an output brake actuation signal which is related to said brake control signal; and an output current limiter connected to said control device and adapted to monitor the magnitude of the current being supplied by the controller to the trailer wheel brake, said limiter including a hall effect device for sensing the strength of the magnetic field generated by the current and being operative to cause the control device to interrupt the current when the magnetic field strength exceeds a predetermined value.

11. A trailer brake controller according to claim 10 wherein said output current limiter further includes a metal hoop which includes a circular portion, said circular portion encircling a wire which conducts electric current to the trailer wheel brake, said hoop further having first and second ends extending from said circular portion, said hall effect device being slidably disposed between said first and second ends of said hoop.

12. A trailer brake controller according to claim 11 wherein said hoop is carried by a housing, said housing having a channel formed therein, said channel receiving said first and second ends of said hoop and said hall effect device, said housing being movable relative to said hall effect device such that said first and second ends of said hoop can be moved relative to said hall effect device to calibrate said output current limiter.

13. A trailer brake controller according to claim 12 is wherein said hoop is formed from a flat strip of metal and further wherein said first end of said hoop is flat and said second end of said hoop is L-shaped.

14. A trailer brake controller according to claim 13 wherein said L-shaped end of said second end of said loop is tapered to concentrate said magnetic field.

15. A trailer brake controller according to claim 14 wherein said control device includes a microprocessor.

16. A trailer brake controller according to claim 14 wherein said control device includes an analog brake controller circuit.

17. A trailer brake controller according to claim 14 wherein said control device includes a brake actuator.

18. A trailer brake controller according to claim 12 wherein said hoop is formed from a length of wire.

19. A trailer brake controller comprising:
- a first manual brake control signal generator for generating a first manual brake control signal;
- a second manual brake control signal generator for generating a second manual brake control signal;
- a microprocessor connected to said first and second manual brake control signal generators and responsive to one of said first or second manual brake control signals to generate an output brake actuation signal which is related to said one of said first or second manual brake control signals, said microprocessor operative to monitor said first and second manual brake control signal generators for a malfunction; and
- a warning device connected to said microprocessor, said microprocessor operative to actuate said warning device upon detection of a malfunction of one of said first or second manual brake control signal generators to indicate which manual brake signal generator has malfunctioned.

20. A trailer brake controller according to claim 19 wherein said microprocessor includes a first manual brake signal input port and a second manual brake signal input port and further wherein said first manual brake control signal generator is connected to said first manual brake signal input port and second manual brake control signal input port is connected to said second manual brake signal input port.

21. A trailer brake controller according to claim 20 wherein said warning device includes a visual display.

22. A trailer brake controller comprising:
- a brake control signal generator for generating a brake control signal;
- a microprocessor connected to said brake control signal generator and responsive to said brake control signal to generate an output brake actuation signal at an output terminal which is related to said brake control signal;
- a brake switching circuit adapted to be connected between a power supply and a set of trailer brakes, said brake switching circuit having a control input terminal connected to said microprocessor output terminal, said brake switching circuit responsive to said output brake actuation signal to supply an electric current from said power supply to said trailer brakes which is a function of said brake actuation signal; and
- a monitoring circuit connected to said brake switching circuit and to an error pin on said microprocessor, said monitoring circuit operative upon a malfunction of said brake switching circuit to generate a malfunction signal and apply said malfunction signal to said error pin.

23. A trailer brake controller according to claim 22 further including a warning device, said microprocessor being responsive to said malfunction signal to actuate said warning device.

24. A trailer brake controller according to claim 23 wherein said warning device includes a visual display.

25. A controller for trailer brakes having return springs for releasing the brakes, the controller comprising:
- a brake control signal generator for generating a brake control signal;
- a microprocessor connected to said brake control signal generator and responsive to said brake control signal to generate an output brake actuation signal which is related to said brake control, said microprocessor continuously generating a predetermined minimum signal sufficient to overcome tension in the brake return springs.

* * * * *